Jan. 21, 1930.   A. BRIESE ET AL   1,744,521
DRILL HOLDER
Filed Nov. 17, 1927
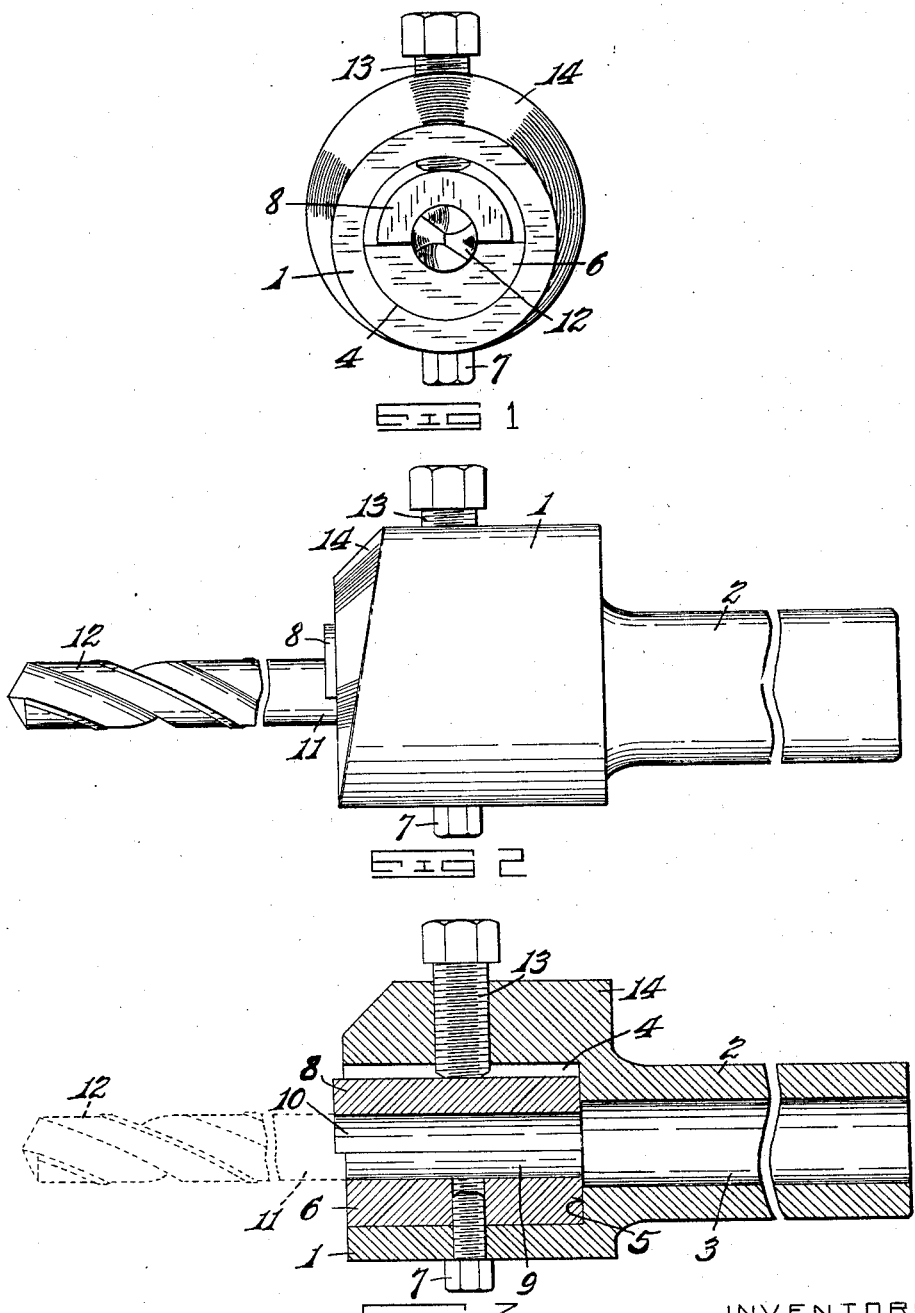

Patented Jan. 21, 1930

1,744,521

UNITED STATES PATENT OFFICE

ALFRED BRIESE AND RUSSELL CALLOW, OF WHEELING, WEST VIRGINIA

DRILL HOLDER

Application filed November 17, 1927. Serial No. 233,812.

This invention relates broadly to holders for drills, and more specifically to a drill holder of the type commonly employed in automatic screw machines, turret laths and other drill-operating mechanisms.

The primary object of the invention is to provide a drill holder with respect to which a drill may be introduced conveniently and quickly and without subjecting the clamping jaws to blows from a hammer or other tool.

It is a well-known fact that the removal of drills from drill holders of the usual commercial forms is frequently attended with considerable difficulty, due largely to the fact that foreign matter including drill cuttings collect and become so tightly wedged about the drill holding collet or jaws that sliding movement of the latter can be induced only by the application of considerable force. In such cases, instead of expending the time and effort required to effect release of the drill by hand, the workman frequently resorts to driving of the collet to drill releasing position by the application thereto of hammer blows. Such blows, repeated from time to time, result in the end, or ends, of the collet becoming burred or peened and in the surfaces of the collet becoming marred to the extent that the latter and, consequently, the drill held thereby do not properly aline with the work.

The present invention is designed to provide a drill holder having jaws which are at all times readily separable for effecting the convenient and practically instantaneous release of the drill.

In describing the invention in detail, reference is herein had to the accompanying drawings, in which—

Figure 1 is a front end elevation of the invention, showing a drill mounted therein;

Figure 2 is a side elevation of the same; and

Figure 3 is a central longitudinal section.

Referring to said drawings, 1 designates the head, and 2 the shank of a drill holder constructed in accordance with our invention. Said shank is provided with an axial bore 3, and provided in the head 1 is a socket 4 which alines axially with and has a relatively greater diameter than said bore, an annular shoulder 5 thus being formed at the inner end of said socket.

Permanently seated within the socket 4 with its inner end resting upon the shoulder 5 is a jaw 6 of substantially semi-tubular form, the outer surface of said jaw being fitted closely upon the adjacent wall of the head 1. While said jaw may be held in place by any suitable means, we prefer to secure the same by means of a radially directed studbolt 7, as shown.

Removably mounted within the socket 4 in complemental gripping relation to the jaw 6 is a second jaw 8, also of semi-tubular form, which has a diameter materially less than that of said socket and which, consequently, is capable of radial movement relative to the jaw 6. Each of the confronting channels 9 and 10 of said jaws 6 and 8, respectively, are designed to receive more or less snugly therein the shank 11 of a drill 12 which is to be held by said jaws.

Following introduction of the drill 12 to its position, a set-screw 13 directed radially through the head 1 at the side occupied by the jaw 8 is tightened against the central portion of the outer surface of the latter for clamping the drill in rigidly seated relation to the jaw 6.

Due to the fact that the jaw 8 is freely movable in the socket 4 relative to the jaw 6 when the set-screw is retracted from impinging relation thereto, it is manifest that both the jaw 6 and the drill 12 are withdrawable from the socket freely, or without the application of force, when the pressure of the set-screw is removed.

For the double purpose of providing an increased thickness of stock for the penetration of the set screw, as shown at 14, and of compensating for the difference in weight between the jaw 8 and the jaw 6, thereby approximately to balance the tool, the head 1 is preferably made of eccentric form, as shown.

The jaw 8 has a length exceeding the depth of the socket 4, thereby to cause its outer end to protrude slightly from said socket.

In such position, the protruding end of said jaw serves to prevent chance contact between the head 1 and the work, thus shielding said head from injury which might result from such contact.

What is claimed is—

A drill holder including a head having an eccentric socket therein so as to provide the head with a thickened segment, a semi-circular jaw seated at its periphery in the socket diametrically opposite to the thickened segment, a loose complementary semi-circular jaw in the socket adjacent to said thickened segment having its periphery spaced at a distance from said segment, said jaws having confronting drill shank receiving grooves to clamp a drill shank therebetween and having side faces formed to engage with one another thereby to aline the jaws, a screw extending through the head and into said first named jaw to hold the latter in fixed position, and a second screw extending through the thickened segment and impinging against the loose jaw whereby upon disengagement of the latter screw therefrom, the loose jaw may be completely removed from the head, the front end of the loose jaw extending outwardly beyond the front end of the head.

In testimony whereof we affix our signatures.

ALFRED BRIESE.
RUSSELL CALLOW.